United States Patent
Chou et al.

(10) Patent No.: US 10,207,488 B2
(45) Date of Patent: Feb. 19, 2019

(54) THREE-DIMENSIONAL OBJECT GENERATING APPARATUS

(71) Applicants: XYZPRINTING, INC., New Taipei (TW); KINPO ELECTRONICS, INC., New Taipei (TW)

(72) Inventors: Ching-Yuan Chou, New Taipei (TW); Min-Hsiung Ding, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 416 days.

(21) Appl. No.: 15/077,612

(22) Filed: Mar. 22, 2016

(65) Prior Publication Data

US 2017/0217099 A1  Aug. 3, 2017

(30) Foreign Application Priority Data

Feb. 2, 2016 (CN) .......................... 2016 1 0072685

(51) Int. Cl.
| | |
|---|---|
| *B33Y 30/00* | (2015.01) |
| *B23K 26/342* | (2014.01) |
| *B29C 64/268* | (2017.01) |
| *B29K 105/00* | (2006.01) |

(52) U.S. Cl.
CPC ............ *B33Y 30/00* (2014.12); *B23K 26/342* (2015.10); *B29C 64/268* (2017.08); *B29K 2105/0058* (2013.01)

(58) Field of Classification Search
CPC ...... B33Y 30/00; B23K 26/342; B29C 64/268
See application file for complete search history.

(56) References Cited

U.S. PATENT DOCUMENTS

| | | | |
|---|---|---|---|
| 6,129,884 A | 10/2000 | Beers | |
| 6,940,037 B1 * | 9/2005 | Kovacevic | ............ B23K 9/044 219/121.64 |
| 2015/0145177 A1 | 5/2015 | El-Siblani | |

OTHER PUBLICATIONS

Search Report dated Jun. 16, 2017 of the corresponding European patent application No. 16167723.2.

* cited by examiner

*Primary Examiner* — Joseph S Del Sole
*Assistant Examiner* — John Robitaille
(74) *Attorney, Agent, or Firm* — Chun-Ming Shih; HDLS IPR Services

(57) ABSTRACT

A 3D object generating apparatus includes an optical-transparent, a laser light generating module, and a controller. The laser light generating module includes a light emitter for outputting a spot beam, a polygon mirror, a flat-field convergent lens, and a flat-field optical sensor. The polygon mirror directs the spot beam into a linear beam. The flat-field convergent lens is positioned between the laser light generating module and the optical-transparent component, and a flat-field scanning route is formed after the linear beam passed through the flat-field convergence lens. The flat-field optical sensor is positioned on the flat-field scanning route senses an optical power of the linear beam and generates a sensed signal. The controller is electrically connected to the laser light generating module and the flat-field optical sensor, and receives the sensed signal and calibrates the optical power of the spot beam based on the sensed signal.

4 Claims, 4 Drawing Sheets

THREE-DIMENSIONAL OBJECT GENERATING APPARATUS

BACKGROUND OF THE INVENTION

Field of the Invention

The present invention relates to an optical apparatus and a method for calibrating the optical apparatus. More particularly, the present disclosure relates to a three-dimensional (3D) object generating apparatus and a method for calibrating the 3D object generating apparatus.

Description of Related Art

Additive manufacturing, three-dimensional (3D) printing, and rapid prototyping are technologies for rapidly generating 3D object. The 3D information for generating 3D object may be made by software (such as CAD) or 3D object scanner.

Stereolithography is a method and apparatus for making 3D object by successively printing thin layers of a curable material one on top of the other. A programmed movable beam shining on a surface or layer of UV curable liquid is used to form a solid cross-section of the object at the surface of the liquid. The object is then moved, in a programmed manner, away from the liquid surface by the thickness of one layer, and the next cross-section is then formed and adhered to the immediately preceding layer defining the object. This process is continued until the entire object is formed.

SUMMARY OF THE INVENTION

According to one aspect of the present disclosure, a method for calibrating optical power is adapted to a three-dimensional (3D) object generating apparatus comprising a laser light generator for generating a linear beam and a flat-field convergent lens, and a flat-field scanning route is formed when the linear beam passing through the flat-field convergent lens, the method comprises: proving a flat-field optical sensor and a controller, wherein the flat-field optical sensor is positioned on the flat-field scanning route, and the controller is electrically connected to the flat-field optical sensor and the laser light generator; using the flat-field optical sensor to sense an optical power of the linear beam passing through the flat-field convergent lens and send a sensed signal based on sensed optical power to the controller; and using the controller to calibrating an optical power of the laser light generator based on the sensed signal.

According to another aspect of the present disclosure, A three-dimensional (3D) object generating apparatus includes an optical-transparent, a laser light generating module, and a controller. The optical-transparent component includes a working region. The laser light generating module includes a light emitter for outputting a spot beam, a polygon mirror, a flat-field convergent lens, and a flat-field optical sensor. The polygon mirror is rotatable around an axis for directing the spot beam into a linear beam. The flat-field convergent lens is positioned between the laser light generating module and the optical-transparent component, and a flat-field scanning route is formed after the linear beam passed through the flat-field convergence lens, and the working region is within coverage of the flat-field scanning route. The flat-field optical sensor is positioned on the flat-field scanning route, wherein the flat-field optical sensor senses an optical power of the linear beam and generates a sensed signal based on the optical power of the linear beam. The controller is electrically connected to the laser light generating module and the flat-field optical sensor, and the controller receives the sensed signal and calibrates the optical power of the spot beam based on the sensed signal.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
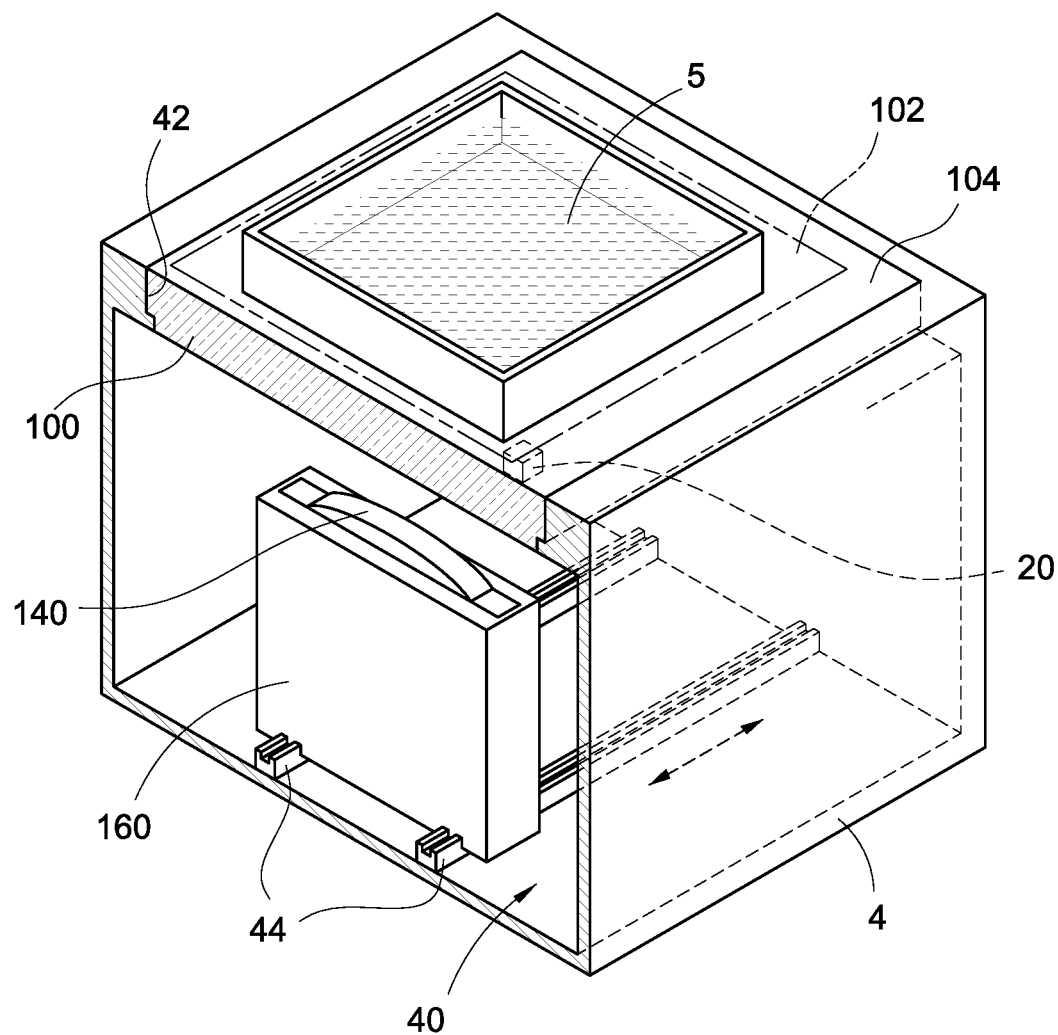
FIG. 1 is a schematic view of a three-dimensional (3D) object generating apparatus according to the present disclosure.
Figure 2:
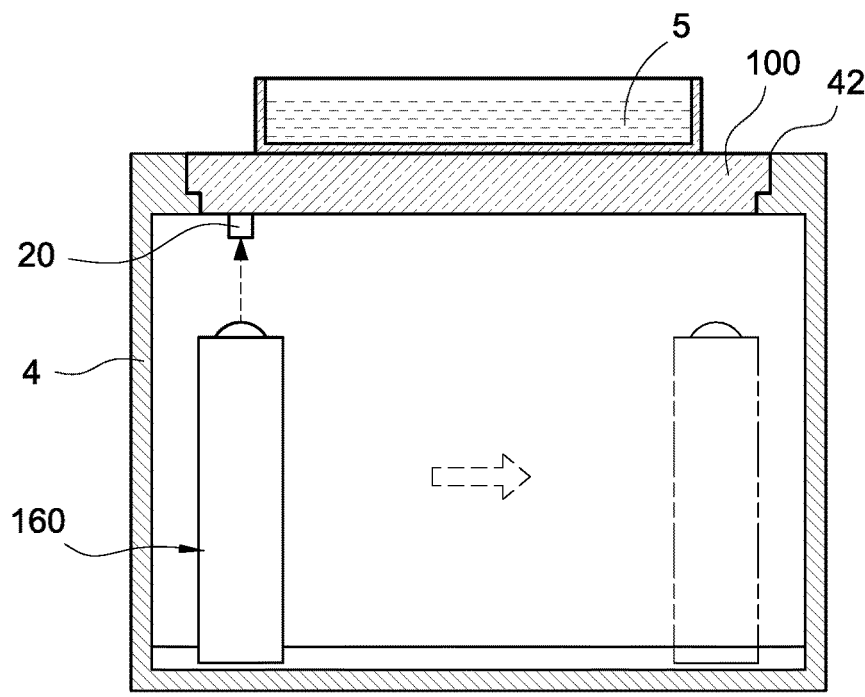
FIG. 2 is a sectional view of the 3D object generating apparatus according to the present disclosure.
Figure 3:
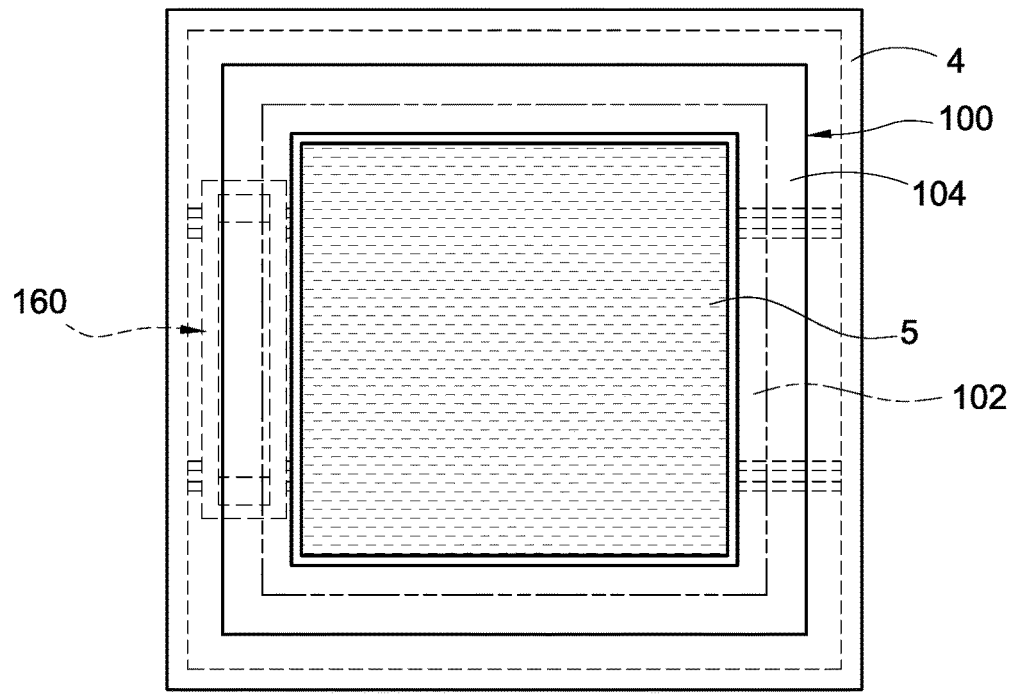
FIG. 3 is a top view of the 3D object generating apparatus according to the present disclosure.

Reference is made to FIG. 1 and FIG. 2; FIG. 1 is a schematic view of a schematic view of a three-dimensional (3D) object generating apparatus according to the present disclosure; FIG. 2 is a sectional view of the 3D object generating apparatus according to the present disclosure. The 3D object generating apparatus (its reference numeral is omitted) includes an optical-transparent component 100, laser light generating module 160, a flat-field optical sensor 20, and housing 4. The housing 4 has an accommodating space 40 and an opening 42 communicating with the accommodating space 40. The optical-transparent component 100 is placed on the opening 42. More particularly, the 3D object generating apparatus may further includes an adhesive placed between the optical-transparent component 100 and the housing 4 for fastening the optical-transparent component 100 on the housing 4. The housing 4 further includes at least one sliding rail 44, as can be seen in FIG. 1, the sliding rail 44 is positioned on an inner surface facing the optical-transparent component 100, and the laser light generating module 160 is assembled with the sliding rail 44, thus the laser light generating module 160 can move along the sliding rail 44.

The optical-transparent component 100 includes a working region 102 and a periphery region 104 surrounding the working area 102. A fluid medium 5 (such as photocurable resin) for producing a 3D object is arranged on the optical-transparent component 100 and in the work region 102. The periphery region 104 of the optical-transparent component 100 is, for example, connects to the housing 4.

Figure 4:
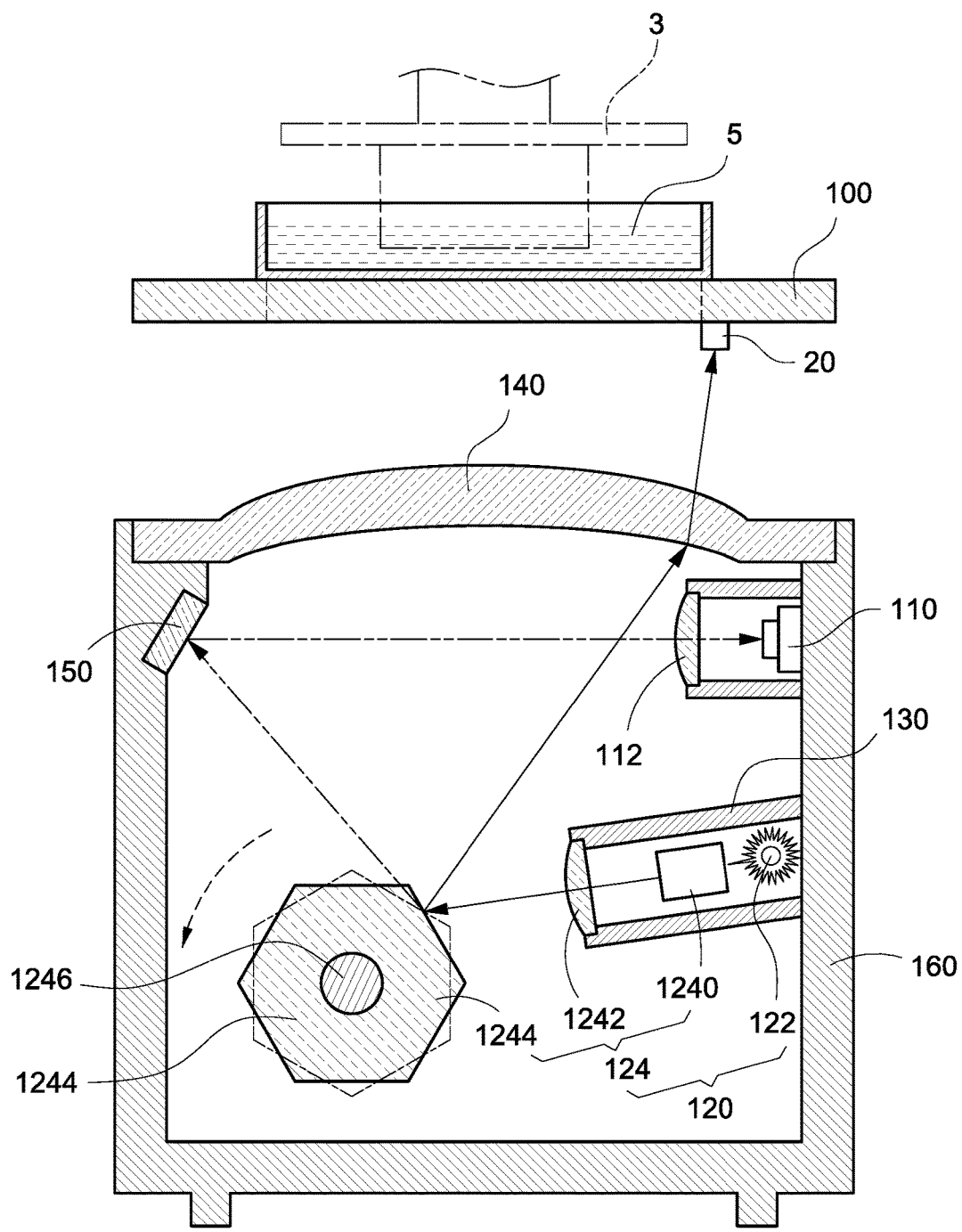
FIG. 4 is a sectional view of the of the 3D object generating apparatus according to the present disclosure.

Reference is made to FIG. 4. The laser light generating module 160 includes a photo detector 110, a focusing lens 112, a laser light generator 120, a flat-field convergent lens 140, and a reflector 150. The laser light generator 120 is configured to generate a linear beam. The flat-field convergent lens 140 positioned between the laser light generator 120 and the optical-transparent component 100 allows the linear beam passing therethrough and then a flat-field scanning route is formed. The working region 102 is within a coverage of the flat-field scanning route, thus the 3D object can be generated within the fluid medium 20 which is selectively cured by the linear beam generated by the laser light generator 120 brought to selective focus prescribed by a 3D model information entering the 3D object generating apparatus.

The laser light generator 120 includes a light emitter 122 and a light adjusting unit 124. The light emitter 122 is, for example, a laser diode, and is configured to emit spot beam. The light adjusting unit 124 includes a collimator 1240, a converging component 1242, and a polygon mirror 1244. The light adjusting unit 124 receives the spot beam emitted from the light emitter 122, and transmitting the beam which is collimated (by the collimator 1240) and converged (by the converging component 1242) to the polygon mirror 1244. The polygon mirror 1244 is positioned in optical path of the adjusted beam and rotatable around an axis 1246 for directing the adjusted beam onto the flat-field convergent lens 140 and the reflector 150 and producing the linear beam. The light emitter 122, the collimator 1240, and the converging component 1242 may be assembled within a barrel 130 fixed onto a shell of the laser light generating module 160.

The flat-field optical sensor 20 is, for example, placed on the optical-transparent component 100, and the flat-field optical sensor 20 and the laser light generator 120 are arranged at the same side of the optical-transparent component 100. The flat-field optical sensor 20 may be placed within the working region 102 or the periphery region 104, and is configured to sense optical power (or called laser power) of the linear beam passed through the flat-field convergent lens 140. The flat-field optical sensor 20 is, for example, made of charge-coupled device (CCD) or complementary metal-oxide-semiconductor (CMOS).

The photo detector 110, the focusing lens 112, and the reflector 150 are positioned between the laser light generator 120 and the flat-field convergent lens 140. The reflector 150 and the focusing lens 112 are position between the polygon mirror 1244 and the photo detector 110 for forming an optical path to sense optical power of the linear beam dies not pass through the flat-field convergent lens 140. More particularly, the reflector 150 may be mounted on the shell of the laser light generating module 160, and the focusing lens 112 between the reflector 150 and the photo detector 110 may be positioned on the focal point of the photo detector 110 for derive a higher accuracy laser power. In practice, the reflector 150 redirects part of the linear beam from the polygon mirror 1244 to the focusing lens 112 positioned above the photo detector 110, and the linear beam is then focused on the photo detector 110. The photo detector 110 senses optical power of the linear beam does not pass through the flat-field convergent lens 140, and then generates a detected signal based on the optical power of the linear beam does not pass through the flat-field convergent lens 140.

Figure 5:
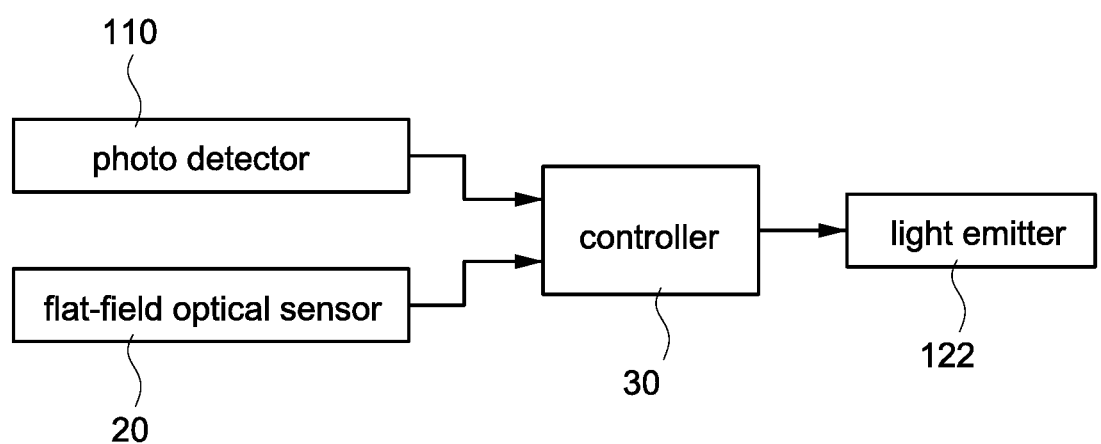
FIG. 5 is a circuit block diagram of the 3D object generating apparatus according to the present disclosure.

Reference is made to FIG. 5, the photo detector 110 and the flat-field optical sensor 20 are electrically connected to the controller 40. The controller 40 is further electrically connected to the light emitter 122. The controller 40 may control the optical power of the spot beam emitted from the light emitter 122 based on the optical power of the linear beam sensed by the flat-field optical sensor 20. However, the controller 40 may also control the optical power of the spot beam emitted from the light emitter 122 based on a difference between the optical power of the linear beam sensed by the flat-field optical sensor 20 and that detected by the photo detector 110.

The controller 30 may have a lookup table providing related data for setting the optical power of the spot beam emitted from the light emitter 122 based on the optical power(s) of the linear beam sensed by the flat-field optical sensor 20 or/and detected by the photo detector 110, thus the controller 30 can obtain the optical power of the spot beam emitted from the light emitter 122 according to the lookup table while the optical power of the linear beam is sensed by the flat-field optical sensor 20 or/and detected by the photo detector 110.

It should be noted that the flat-field convergent lens 140 changes its transmittance and refractive properties with age. The controller 30 can determined whether the flat-field convergent lens 140 ages or not based on the optical power sensed by the flat-field optical sensor 20 and that detected by the photo detector 110 since the flat-field optical sensor 20 is configured to sense the optical power of the linear beam passing through the flat-field convergent lens 140 and the photo detector 110 is configured to detect the optical power of the linear beam does not pass through the flat-field laser convergent lens 140. More particularly, when the flat-field convergent lens 140 ages, the optical power of the linear beam passed through the flat-field convergent lens 140 is less than that does not pass through the flat-field convergent lens 140 since the material properties and refractive coefficient of the flat-field convergent lens 140 is changed, thus the controller 40 may determine whether the flat-field convergent lens 140 ages or not based on the difference between the sensed signal and the detected signal. If the flat-field convergent lens 140 ages, the controller 30 may calibrate the optical power of the spot beam emitted from the light emitter 122 to make the optical power of the linear beam passed through the aged flat-field convergent lens 140 be a constant for stabilizing the quality of the 3D object.

Besides, the controller 30 may generate a warming signal when the optical power of the linear beam passed through the flat-field laser convergent lens 20 is lower than a preset optical power to indicated user that the flat-field convergent lens 140 is inadequate to transmit linear beam.

The calibrating procedure for calibrating the optical power of the linear beam of the 3D object generating apparatus may be performed before a 3D object generating procedure is performed; however, the calibrating procedure may also be performed during the 3D object generating procedure is performed or after the 3D object generating procedure is performed.

The calibrating procedure for calibrating optical power of the 3D object generating apparatus starts with driving the laser light generator 120 to generate the linear beam by a controller 30, the linear beam is projected to the working region 102. The flat-field optical sensor 20 then senses the optical power of the linear beam and sends the sensed signal based on the sensed optical power to the controller 30.

Thereafter, the controller 30 obtains the optical power of the spot beam emitted from the light emitter 122 based on the lookup table and the sensed signal. When and the optical power of the linear beam sensed by the flat-field optical sensor 20 is lower than the preset optical power for curing the fluid medium 5 and the optical power of the spot beam emitted from the light emitted 122 is higher than a normal operating optical power, the controller 30 increases the optical power of the spot beam emitted from the light emitter 122. On the contrary, when the optical power of the linear beam sensed by the flat-field optical sensor 20 is higher than the preset power and the optical power of the spot beam emitted from the light emitted 122 is higher than the normal operation optical power, the controller 30 decreases the optical power of the spot beam emitted from the light emitter 122. Therefore, the optical power of the linear beam passed through the flat-field convergent lens 120 can be calibrated to be a constant, and the quality for generating the 3D object is stabilized.

Moreover, the controller 30 may output the warming signal when the photo power of the spot beam emitted from the light emitted 122 is lower than the normal operating photo power to indicating user that the fluid medium 5 cannot be well cured.

Furthermore, the controller 30 may calibrate the optical power of the spot beam emitted from the light emitter 122 based on the sensed signal generated by the flat-field optical sensor 20 and the detected signal generated by the photo detector 110.

To sum up, the present invention provides the method for calibrating the optical power of the 3D object generating apparatus includes the optical-transparent component 100, the flat-field convergent lens 120, and laser light generator including a light emitter 112. The mothed starts with providing the flat-field optical sensor 20 and the controller 30; the flat-field optical sensor 20 is positioned on the optical-transparent 100, and the controller 30 is electrically connected to the flat-field optical sensor 20 and the light emitter 122. The flat-field optical sensor 20 senses the optical power of the linear beam generated by the laser light generator 120 and passed through the flat-field convergent lens 140 and generates a sensed signal. The controller 30 calibrates the optical power of the spot beam emitted by the light emitter 122 based on the sensed signal when the optical power of the linear beam passed through the flat-field convergent lens 140 is different from the preset optical power to makes the optical power of the linear beam passed through the flat-field convergent lens 140 for curing the fluid medium 5 be a constant.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A three-dimensional (3D) object generating apparatus comprising:
   an optical-transparent component comprising a working region;
   a laser light generating module comprising:
   a light emitter for outputting a spot beam;
   a polygon mirror rotatable around an axis for directing the spot beam into a linear beam;
   a flat-field convergent lens positioned between the laser light generating module and the optical-transparent component, wherein a flat-field scanning route is formed after the linear beam passed through the flat-field convergence lens, and the working region is within a coverage of the flat-field scanning route,
   a flat-field optical sensor positioned on the flat-field scanning route, wherein the flat-field optical sensor senses an optical power of the linear beam and generates a sensed signal based on the optical power of the linear beam; and
   a controller electrically connected to the laser light generating module and the flat-field optical sensor,
   wherein the controller receives the sensed signal and calibrates the optical power of the spot beam based on the sensed signal.

2. The apparatus of claim 1, further comprising:
   an photo detector positioned between the laser light generating module and the flat-field convergent lens and electrically connected to the controller, wherein the photo detector is configured to detect an optical power of the linear beam does not pass through the flat-field convergent lens and generates a detected signal;
   a reflector positioned between the laser light generating module and the photo detector;
   a converging component positioned between the reflector and the photo detector;
   wherein the controller calibrates the optical power of the spot beam generated by the light emitter base on the detected signal and the sensed signal.

3. The apparatus of claim 2, wherein the flat-field optical sensor and the laser light generating module are arranged at the same side of the optical-transparent component.

4. The apparatus of claim 1, wherein the flat-field optical sensor is made of charge-coupled device or complementary metal-oxide-semiconductor.

* * * * *